United States Patent
Kanehira et al.

(10) Patent No.: US 6,432,011 B1
(45) Date of Patent: Aug. 13, 2002

(54) SILENT CHAIN

(75) Inventors: Makoto Kanehira; Kazumasa Matsuno; Hitoshi Ohara; Shigekazu Fukuda; Hiroshi Horie; Takayuki Funamoto; Yoshihiro Kusunoki; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/599,073

(22) Filed: Jun. 22, 2000

(30) Foreign Application Priority Data

Jun. 23, 1999 (JP) ............................. 11-177377

(51) Int. Cl.⁷ ............................................. F16G 13/04
(52) U.S. Cl. ...................................... 474/215; 474/213
(58) Field of Search ................................ 474/206, 213, 474/214, 215, 218, 225, 227, 228, 229

(56) References Cited

U.S. PATENT DOCUMENTS

| | | | |
|---|---|---|---|
| 1,651,832 A | * 12/1927 | Morse | ............... 474/216 |
| 1,868,334 A | * 7/1932 | Morse | ............... 474/216 |
| 2,067,243 A | 1/1937 | Perry | |
| 2,096,061 A | 10/1937 | Perry | |
| 2,725,755 A | 12/1955 | Riopelle et al. | |
| 3,043,154 A | 7/1962 | Karig et al. | |
| 5,242,334 A | 9/1993 | Sugimoto et al. | |
| 5,651,746 A | 7/1997 | Okuda | |
| 6,186,921 B1 | * 2/2001 | Kotera | ............... 474/215 |

FOREIGN PATENT DOCUMENTS

JP 2000-352445 * 12/2000 ........... F16G/13/04

* cited by examiner

Primary Examiner—David A. Bucci
Assistant Examiner—Vicky A. Johnson
(74) Attorney, Agent, or Firm—Howson & Howson

(57) ABSTRACT

A silent chain include a number of link modules articulately connected together in an endless fashion by rocker joint pins. The rocker joint pins include a first rocker joint pin composed of a first longer pin and a first shorter pin each having a different first thickness in a direction of pitch of the rocker joint pins, and a second rocker joint composed of a second longer pin and a second shorter pin each having a different second thickness in the direction of pitch of the rocker joint pins. The second thickness of the second longer or shorter pin is different from the first thickness of a corresponding one of the first longer and shorter pins. The first joint rocker pin and the second rocker joint pin are arranged in a random pattern along the length of the silent chain so as to suppress generation of periodic noise when teeth of the silent chain and teeth of a sprocket engage with each other.

3 Claims, 2 Drawing Sheets

SILENT CHAIN

BACKGROUND OF THE INVENTION

1. Field of the Invention

The present invention relates generally to a silent chain having rocker joint pins, and more particularly to a silent chain including link plates articulately connected in an endless fashion by means of rocker joint pins disposed at different pitches.

2. Description of the Related Art

Silent chains are wound around at least two spaced sprockets for transmitting power between these sprockets. The silent chain includes a succession of link modules articulately connected together in an endless fashion. Each link module is formed by either a single link plate or a plurality of link plates overlapped side by side. Each link plate has a pair of bifurcated meshing portions or teeth on one longitudinal side thereof for meshing engagement with teeth of each sprocket and a pair of pin holes formed therein for receiving a pair of pivot pins, respectively.

At the onset of meshing engagement between the link plates of the silent chain and the teeth of the sprocket, respective inside or outside flanks of the teeth of the link plate are caused to interfere with the sprocket teeth. At this time, impact or collision sound occurs. Such a collision sound per se constitute a problem, but a more serious problem is that the collision sound occurs periodically.

To deal with the latter-mentioned problem, several solutions have been proposed as disclosed in Japanese Patent Publication No. HEI-3-51933 and Japanese Utility Model Publication HEI-8-1312.

A silent chain disclosed in Japanese Utility Model Publication HEI-8-1312 seeks to prevent generation of periodic collision sound by adopting link plates of more than one shape which are designed such that the interval of contact points between outside flanks of the teeth of the link plates and the sprocket teeth is variable on an every link plate basis.

According to Japanese Patent Publication No. HEI-3-51933, the silent chain uses differently profiled link plates designed such that the interval of contact points between inside flanks of the teeth of the link plates and the sprocket teeth is made variable on an every link plate basis so as to prevent generation of periodic collision sound.

The prior solutions, both relying on a varying link pitch, are still unsatisfactory due to drawbacks as discussed below.

The link plates are usually manufactured through punching processes and hence require punching molds or dies for the manufacture thereof. Especially in the case of link plates used for silent chains, a large punching force is required for die-cutting the outline of a link plate and punching pin holes in the link plate. In addition, partly because the die-cut peripheral surface of the link plate includes the outside and inside flanks adapted to be engaged with the sprocket teeth, and partly because the punched pin holes have direct effects upon the chain pitch, the peripheral surface of the link plate and inner surfaces of the pin holes must be processed with high accuracy. In a punching process, a relatively smooth sheared surface and a relatively rough broken surface contiguous with the sheared surface are formed. Since the link plate requires high dimensional accuracy and a high percent shear, the punching dies used in the manufacture of the link plate must be replaced frequently to avoid wear.

A punching die, which is highly precise and is able to withstand a heavy load, is very expensive. Thus, production of more than one type of link plates using such expensive punching dies appears to be totally uneconomical. In addition, since the silent chain has a great number of links each comprised of more than one link plate, an enormous punching-die manufacturing cost is not avoidable.

In addition, two or more types of link plates used for assembling a silent chain require a large storage space as well as an increased manpower for transportation and inventory. This will make the manufacture of the silent chain totally uneconomical.

SUMMARY OF THE INVENTION

With the foregoing drawbacks of the prior art in view, it is an object of the present invention to provide a silent chain which includes rocker joint pins arranged at different pitches along the length of the silent chain so as to reduce periodic noise generated when teeth of the silent chain come into meshing engagement with teeth of a sprocket.

Another object of the present invention is to provide a silent chain having rocker joint pins arranged at different pitches along the length of the silent chain so as to make the silent chain economical from the viewpoint of manufacture and inventory of parts of the chain.

In order to accomplish the above-mentioned objects, the present invention provides a silent chain comprising a number of link modules adjacent to each other and articulately connected together in an endless fashion by rocker joint pins. Each of the link modules is comprised of at least one link plate having a pair of spaced meshing portions on one side thereof, and a pair of pin holes spaced in the longitudinal direction of the link plate. Each of the rocker joint pins is inserted through the pin holes in the link plates of two adjacent ones of the link modules. The said rocker joint pins include a first rocker joint pin and a second rocker joint pin arranged in a random pattern along the length of the silent chain. The first rocker joint pin is comprised of a combination of a first longer pin and a first shorter pin disposed back-to-back within the same pin hole. The first longer and shorter pins each have a different first thicknesses as measured in a direction of pitch between contact points of the longer and shorter pins when the silent chain is in a straight-line state. The second rocker joint pin is comprised of a combination of a second longer pin and a second shorter pin disposed back-to-back within the same pin hole. The second longer and shorter pins each have a different second thickness as measured in the direction of pitch when the silent chain is in the straight-line state. The second thickness of the second longer or shorter pin is different from the first thickness of a corresponding one of the first longer and shorter pins.

It is preferable that the difference between the respective first thicknesses of the first longer and shorter pins and the difference between the respective second thicknesses of the second longer and shorter pins are in the range of from 0.2 to 3.0% of a reference chain pitch of the silent chain.

The silent chain, as it is about to mesh with a sprocket, takes a straight-line position. And at the onset of meshing engagement between the silent chain and the sprocket, outside teeth flanks or inside tooth flanks of the chain are caused to interfere with teeth of the sprocket. And at this moment, impact or collision sound is generated between the tooth flanks and the sprocket teeth.

It is import to note that rocker joint pins each composed of a longer and a shorter pin disposed back-to-back within one pin hole of each link plate have a pitch defined by the distance between contact points of two adjacent pairs of longer and shorter pins. At the onset of meshing engagement between the chain teeth and the sprocket teeth, the silent chain is in a straight-line state and the outside flanks or inside flanks of the chain teeth are caused to engage with the sprocket teeth. In each of the first and second rocker joint pins, a thickness of the longer pin, as measured in a direction of the pitch of contact points between the adjacent pairs of longer and shorter pins, is made different from a corresponding thickness of the shorter pin. The first rocker pin and the second rocker joint pin are arranged in a random pattern along the length of the silent chain so that the silent chain has three different pin contact-point pitches.

Since the rocker joint pins are manufactured by a multi-stage drawing process using more than two drawing dies, it is readily possible to produce a relatively thick pin (longer pin or shorter pin) and a relatively thin pin (shorter pin or longer pin) in succession. The rocker joint pin does not require a punching process and hence can be manufactured at a low cost as compared to the link plate.

In the case where two kinds of rocker joint pins are used, a total of four pins (i.e., a relatively thick longer pin, a relatively thin longer pin, a relatively thick shorter pin and a relatively thin shorter pin) must be provided. However, a longer pin and a shorter pin can be produced by cutting off from a single continuous drawn pin-like material provided that these pins have the same thickness. Accordingly, in practice, only two types of drawn pin-like materials are required. Furthermore, in the case where a relatively thick pin and a relatively thin pin are produced in succession through the multi-stage drawing process, all of the four pins can be produced from a single row material.

By using the rocker joint pins, it becomes possible to vary the contacting timing between the outside flanks or inside flanks of the chain teeth and the sprocket teeth. Variations in contact timing are effective to suppress generation of periodic noise.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
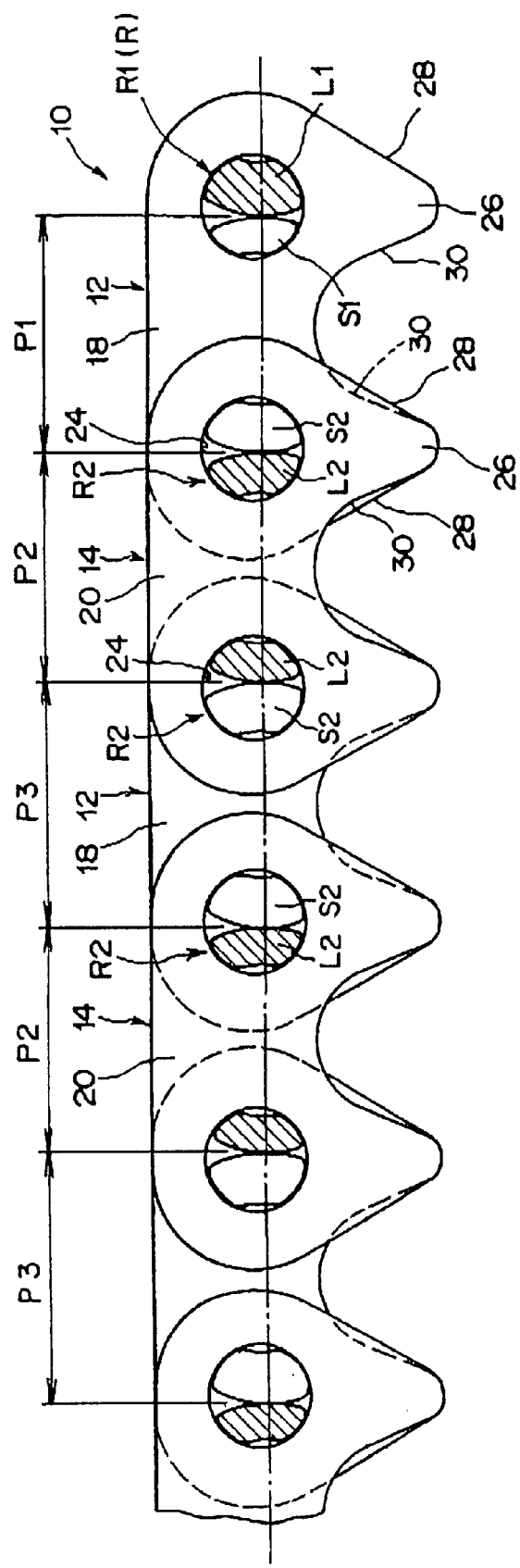
FIG. 1 is a fragmentary side view of a silent chain, shown with guide plates omitted, according to an embodiment of the present invention.
Figure 2:
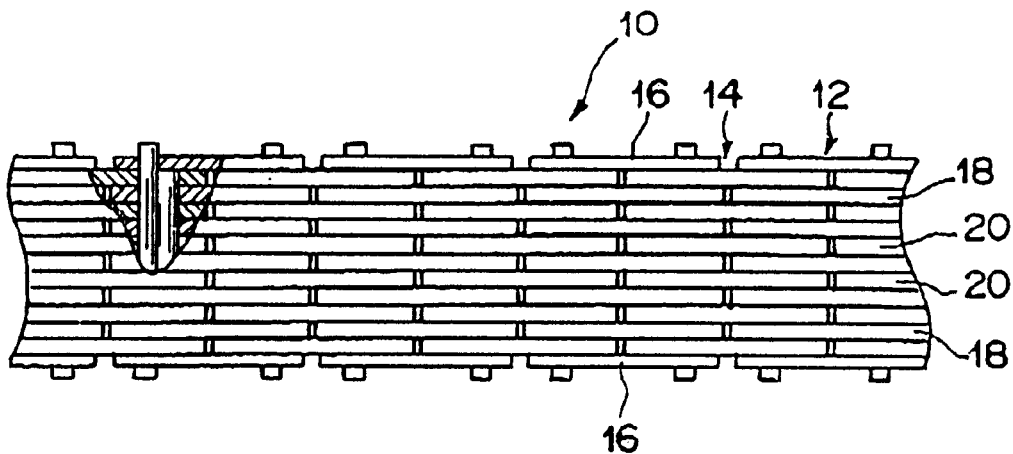
FIG. 2 is a plan view, with parts cut away for clarity, of the silent chain.

Referring now to the drawings and FIGS. 1 and 2 in particular, there is shown a silent chain 10 according to an embodiment of the present invention. The silent chain 10 includes guide links 12 and articular links 14 alternately arranged in the longitudinal direction of the silent chain 10 and articulately connected together in an endless fashion. The guide and articular links 12, 14 each form one link module.

Each of the guide link modules 12 has a pair of guide plates 16 (FIG. 2) and at least one guide link plate 18 disposed between the guide plates 16. Each of the articular link modules 14 has at least two laterally juxtaposed articular link plates 20. The number of the articular link plates 20 is one more than the number of the guide link plates 18. In the illustrated embodiment, five guide link plates 18 are used to form a single guide link module 12, and six articular link plates 20 are used to form a single articular link module 14. The guide link plates 18 and the articular link plates 20 have the same shape and configuration. The thickness of the guide link plates 18 may be different from the thickness of the articular link plates 20.

The guide plates 16 of the guide link modules 12 are adapted to be slidably engaged with opposite sidewalls of each sprocket (not shown) so as to guide movement of the silent chain 10 around the sprocket. The guide plates 16 each have a pair of pin holes spaced in the longitudinal direction of the silent chain 10.

Each of the link plates 18, 20 has a virtually bifurcated or V-shaped configuration to provide a pair of spaced meshing portions or teeth 26, 26 on one longitudinal side of the link plate (corresponding to an inner circumferential edge of the silent chain 10), and a pair of pin holes 24, 24 spaced in the longitudinal direction of the silent chain 10. Each of the teeth (meshing portions) 26 has an outside flank 29 and an inside flank 30 converging togther at a tip (not designated) of the tooth 26. The respective inside flanks 30, 30 of the teeth 26 are symmetrically profiled and connected together by an arcuately concave crotch (not designated).

The guide link modules 12 and the articular link modules 14 are connected by rocker joint pins R. Each of the rocker joint pins R is composed of a longer pin L and a shorter pin S having a length smaller than that of the longer pin L. The longer pin L is inserted through the pin holes 24 of the link plates 18, 20 of two adjacent link modules 12, 14 and fitted in each pair of transversely aligned pin holes of the guide plates 16. The shorter pin S is inserted through the pin holes 24 of the link plates 18, 20 of two adjacent link modules 12, 14. The longer pin L and the shorter pin S jointly occupy one pin hole 24 and they are disposed back-to-back within the same pin hole 24 such that opposed arcuately convex rolling surfaces (not designated) of the longer and shorter pins L, S are in contact with each other for enabling rolling movement of the longer pin L relative to the shorter pin S. The longer pins L and the shorter pins S are prevented from rotating within the pin holes 24. To this end, the holes 24 are designed to have a non-circular cross section or formed with seat surfaces engageable with corresponding seat surfaces of the longer and shorter pins.

As shown in FIG. 1, the rocker joint pins R of the silent chain 10 is comprised of a combination of a first rocker joint pin R1 and a second rocker joint pin R2. The first rocker joint pin R1 is composed of a longer pin L1 and a shorter pin S1 which is smaller in length than the longer pin L1. A thickness of the longer pin L1, as measured in a direction of pitch of contact points between adjacent pairs of longer and shorter pins when the silent chain 10 is in a straight-line state, is made larger than a corresponding thickness of the shorter pin S1. The second rocker joint pin R2 is composed of a longer pin L2 and a shorter pin S2 which is smaller in length than the longer pin L2. A thickness of the longer pin L2, as measured in the pitch-wise direction of the contact points between adjacent pairs of longer and shorter pins when the silent chain 10 is in a straight-line state, is made smaller than a corresponding thickness of the shorter pin S2.

The first and second rocker joint pins R1 and R2 are fitted in the pin holes 24 of the link plates 18, 20. The first rocker joint pin R1 and the second rocker joint pin R2 are arranged in a random pattern along the length of the silent chain 10.

Thus, when the silent chain 10 is in the straight-line state, the adjacent contact points are spaced at different intervals or pitches.

In the illustrated embodiment, two types of rocker joint pins R1 and R2 are used, so that the silent chain 10 has link plates 18, 20 interleaved at three different pitches P1, P2 and P3 of contact points along the length thereof. If three types of rocker joint pins are used, a resulting silent chain will have link plates interleaved at six different pitches along the length thereof.

When the silent chain 10 of the foregoing construction goes into meshing engagement with a sprocket not shown, respective outside flanks 28 or inside flanks 30 of the teeth (meshing portions) 26 of the link plates 18, 20 are caused to interfere with the sprocket teeth. In this instance, because the pitch of contact points between adjacent pairs of longer and shorter pins is not uniform but set to vary in the longitudinal direction of the silent chain 10, the contacting timing between the teeth 26 and the sprocket teeth is caused to change on an every link module base. Because all the link plates 18, have the same shape and configuration as described previously, by thus changing the contact-point pitch of the silent chain 10 module by module, the contacting timing of the outside tooth flanks 28 or the inside tooth flanks 30 relative to the sprocket teeth varies correspondingly. By thus changing the contacting timing, occurrence of periodic noise can be considerably suppressed.

Figure 3:
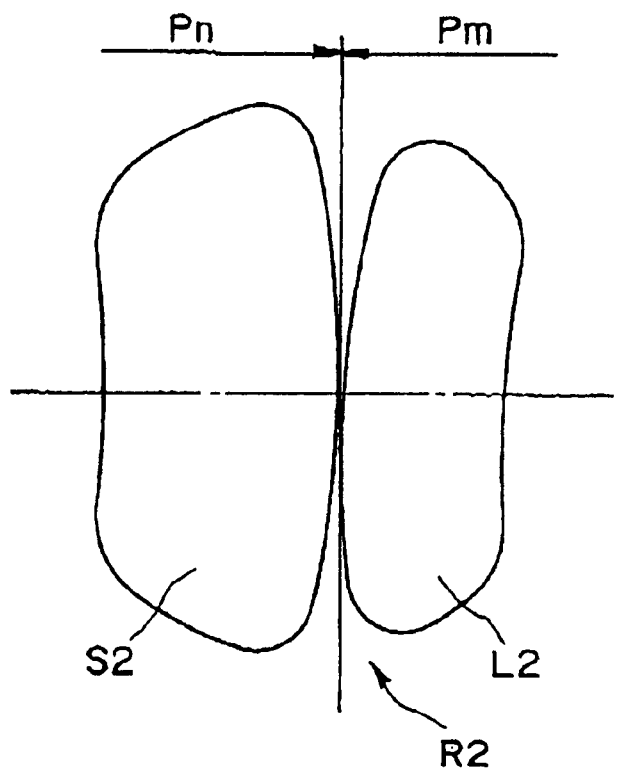
FIG. 3 is an enlarged side view of a rocker joint pin of the silent chain.

FIGS. 1 and 3 show in exaggerated manner the difference in thickness between a longer pin L1 (L2) and a shorter pin S1 (S2) used in pair. The thickness difference as measured in a pitch-wise direction of the contact points between the adjacent pairs of longer and shorter pins is preferably in the range of from 0.2% to 3.0% of a reference chain pitch. If the thickness difference is less than 0.2% of the reference chain pitch, only a limited periodic-noise suppressing effect can be attained. Conversely, if the thickness difference is greater than 3.0% of the reference chain pitch, great collision noise would occur due to undue interference between the outside or inside flanks of the teeth and the sprocket teeth.

It is important to note that contact points between adjacent pairs of longer and shorter pins are arranged at different intervals or pitches along the length of a silent chain. By thus arranging the contact-point pitch, the contact timing of outside flanks or inside flanks of the chain teeth relative to the sprocket teeth varies correspondingly with the result that impact sounds generated periodically between the outside or inside tooth flanks and the sprocket teeth can be suppressed. A low-noise silent chain can thus be provided.

The rocker joint pins can be manufactured at a lower cost than the link plates, and so the same noise-suppressing effect achieved as before by using differently profiled link plates can be achieved economically. By merely using two types of rocker joint pins, three different pitches can be obtained. Four or more different pin contact-point pitches can readily be obtained by using more than two types of rocker joint pins.

More than two types of rocker joint pins may be used according to the present invention, in which instance, variations in meshing timing between the chain and the sprocket become greater.

As compared to the conventional silent chain wherein the link plates are modified to provide a variable chain pitch, the silent chain of the present invention requires much fewer man hours for storage, transportation and inventory thereof.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain comprising:

a number of link modules adjacent to each other and articulately connected together in an endless fashion by rocker joint pins, each of said link modules comprising at least one link plate having a pair of spaced meshing portions on one side thereof, and a pair of pin holes spaced in the longitudinal direction of said link plate, each of said rocker joint pins being inserted through pin holes in the link plates of two adjacent ones of said link modules, wherein said rocker joint pins include a plurality of first rocker joint pins and a plurality of second rocker joint pins arranged in a random pattern along the length of said silent chain, each rocker joint pin comprising a pair of pins in back-to-back relationship with respective arcuately convex rocker surfaces held in rolling contact with each other and contacting each other at contact lines, wherein each said first rocker joint pin comprises a combination of a first longer pin and a first shorter pin disposed back-to-back within the same Qin hole, said first longer and shorter pins having different thicknesses as measured in a direction of pitch between contact lines of the back-to-back pins of successive rocker joint pins when said silent chain is disposed in a straight-line, and wherein each said second rocker joint pin comprises a combination of a second longer pin and a second shorter pin disposed back-to-back within the same pin hole, said second longer and shorter pins having different thicknesses as measured in said direction of pitch when said silent chain is disposed in a straight-line, the thickness of at least one of said second longer and shorter pins being different from the thickness of a corresponding one of said first longer and shorter pins, whereby the chain has at least three different pitches along its length.

2. A silent chain according to claim 1, wherein the difference between the respective first thicknesses of said first longer and shorter pins and the difference between the respective second thicknesses of said second longer and shorter pins are in the range of from 0.2 to 3.0% of a reference chain pitch of said silent chain.

3. A silent chain according to claim 1, in which, in the respective pin holes of some of the link plates of the chain, the pins are arranged so that the longer pins are disposed toward an intermediate location in the longitudinal direction of the link plates, and in the respective pin holes of the remaining link plates of the chain, the pins are arranged with the shorter pins disposed toward an intermediate location in the longitudinal direction of the link plate.

* * * * *